May 18, 1965  A. J. WOOLCOTT  3,184,245
PISTON RINGS

Filed Feb. 13, 1961  2 Sheets-Sheet 1

Inventor
A. J. Woolcott
By
Attorneys

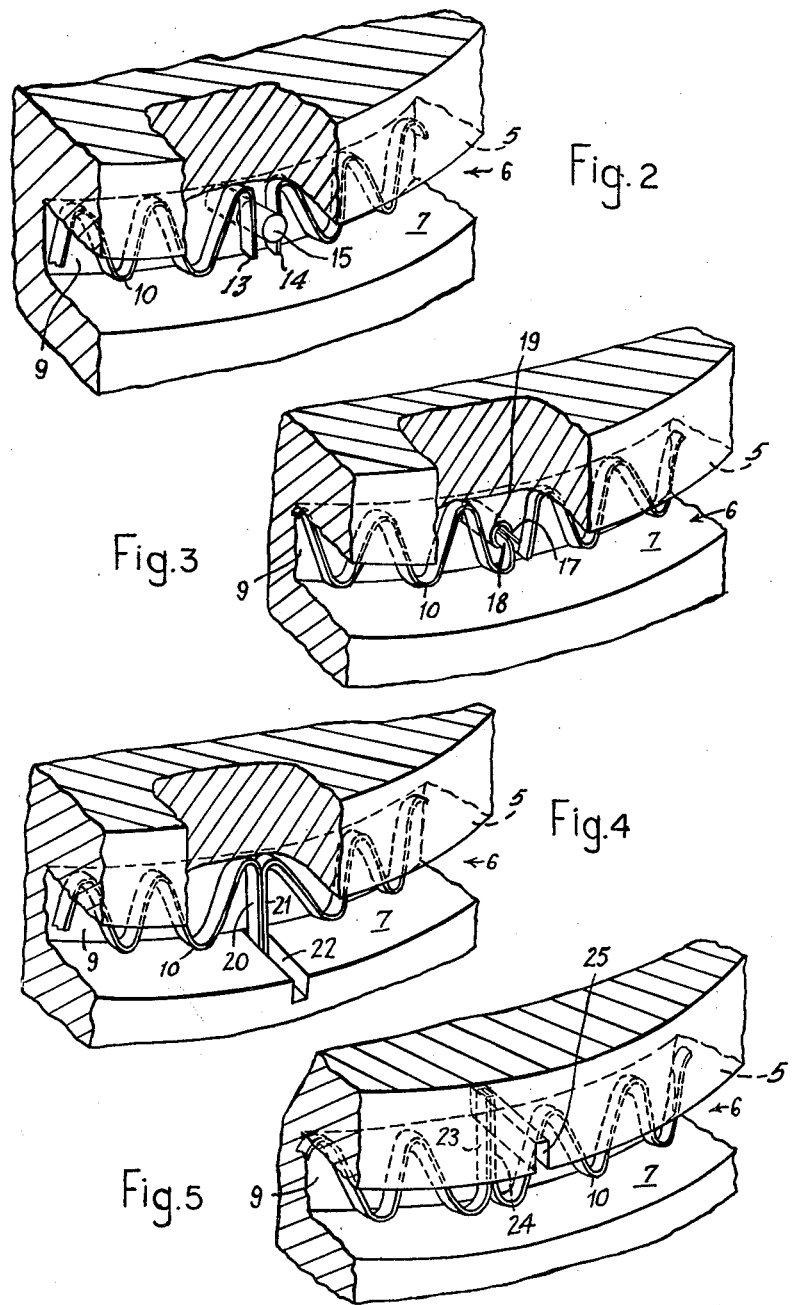

United States Patent Office 3,184,245
Patented May 18, 1965

3,184,245
PISTON RINGS
Arthur John Woolcott, Lymington, Hampshire, England, assignor to Wellworthy Limited, Lymington, England, a British company
Filed Feb. 13, 1961, Ser. No. 88,744
Claims priority, application Great Britain, Feb. 19, 1960, 5,983/60
7 Claims. (Cl. 277—136)

The present invention relates to annular sealing arrangements of the kind which are adapted to be inserted into a groove having parallel lands formed in one of two relatively reciprocable members between which a seal is required to be obtained. Hereinafter such sealing arrangements will be referred to as "of the kind described." More particularly the invention relates to cylinder and piston arrangements, for example for automobiles.

It is an object of the invention to provide a sealing arrangement of the kind described so as to provide axial pressure against the upper and lower lands of the groove, assuming that the reciprocating movement is in a vertical direction, and also radial pressure so as simultaneously to apply pressure in a radial direction to cause the arrangement to be applied to the other co-acting member.

The present invention accordingly provides a composite piston ring arrangement comprising a pair of flat split sealing rings for location in a piston ring groove of a piston so that said rings abut the upper and lower lands of said groove, a first axially-corrugated strip-form expander spring located between said sealing rings to apply said rings to said upper and lower lands respectively, a second axially-corrugated strip-form expander spring located within said sealing rings, said second expander spring having shaped ends for respectively contacting an abutment in a piston-ring groove to cause said second expander spring to apply pressure to said sealing rings.

The invention also provides a piston and piston ring combination, said piston having a groove to receive said piston ring, wherein said piston ring comprises a pair of flat split sealing rings for location in said piston ring groove so that said rings abut the upper and lower lands of said groove, a first axially-corrugated strip-form expander spring located between said sealing rings to apply said rings to said upper and lower lands respectively, a second axially-corrugated strip-form expander spring located within said sealing rings, said second expander spring having shaped ends and said piston ring groove being apertured to receive said shaped ends of said second expander spring, to cause said second expander spring to apply radial pressure to said sealing rings.

Preferably the interconnecting parts between the upper and lower crowns of the corrugations of the said second-mentioned expander spring make an angle not exceeding 20° to lines passing through said crowns and parallel to the longitudinal axis of the composite piston ring.

In order that the invention may be more clearly understood reference will now be made to the accompanying drawings which show some embodiments thereof by way of example and in which:

FIGURES 2 to 5 show fragments of different embodiments of the second-mentioned expander spring positively secured in relation to a piston ring groove, parts of which also are shown.

Figure 1:
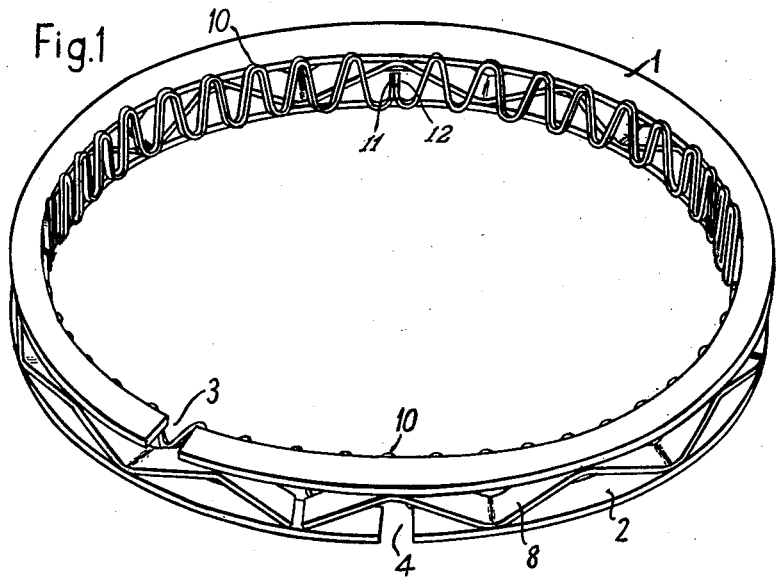
FIGURE 1 shows a perspective view of one embodiment of a sealing arrangement.

Referring to the drawings which show embodiments of composite piston ring arrangements constituting an annular sealing arrangement according to the invention, FIGURE 1 shows upper and lower sealing rings 1 and 2 respectively which are circularly formed from flat strip metal leaving gaps 3 and 4. Assuming that the piston crown is uppermost and horizontal the ring 1 abuts the upper land 5 of a piston ring groove 6 and ring 2 abuts the lower land 7 thereof, as shown in FIGURE 3.

A first expander spring 8 which is horizontally i.e., axially corrugated and formed from flat metal strip is located between the two rings 1 and 2, the shaping of the corrugations being such as to cause the rings 1 and 2 to be applied under pressure to the upper and lower lands 5 and 7 of the piston ring groove 6 when the arrangement is in the assembled position.

Located between the sandwich comprising the upper and lower rings 1 and 2 and the first expander spring 8, and the circumferential wall or base 9 of the piston ring groove 6 there is located a second expander spring 10 which is formed from flat strip metal which also is axially corrugated and formed into a ring with the upward-going ends 11, 12 of the corrugated strip projecting inwardly. Thus, both the first expander spring 8 and the second expander spring 10 are axially corrugated, i.e., are each corrugated in a plane perpendicular to the planes of the sealing rings 1 and 2.

In FIGURE 2, the ends 13, 14 of the spring 10 abut the opposite sides of a peg or the like 15 fixed in the base 9 of the groove 6. The peg 15 may be fitted into an oil drainage hole as normally provided.

In FIGURE 3, the ends 17, 18 of the spring 10 are inwardly directed similarly to the showing of FIGURE 1 and are housed in a recess 19 in the base of the ring groove 6, which is preferably one of the oil drainage holes normally provided. The difference between the arrangement of FIGURE 1 and that of FIGURE 3 is that in FIGURE 3 one end 17 of spring 10 is upward-going and the other end 18 is downward-going.

In FIGURE 4, the ends 20, 21 of ring 10 are downwardly directed and are housed in a recess 22 in the lower land 7 of the groove 6.

FIGURE 5 shows the reverse arrangement to FIGURE 4: the ends 23, 24 are upwardly directed and are housed in a recess 25 in the upper land 5 of the groove 6.

In FIGURES 4 and 5, the ends of the ring are both directed in the same way, which prevents incorrect fitting, which might be possible if they were oppositely directed.

It will be apparent that the spring 10 may have shapes other than those shown.

The arrangements of FIGURES 2 to 5 ensure that there is no overlapping of the ends of the spring 10 either in assembly or in operation, and also prevent it from rotating in the groove. They also prevent the ring 10 from bearing against the base 9 of the groove and these measures minimise wear of the ring 10 and the groove 6, which is a very important feature.

Because the ends of the spring 10 abut a relatively fixed anchorage in all embodiments, the ring 10 exerts a radially outward force on the rings 1 and 2 to urge them against the cylinder wall.

I claim:

1. A composite piston ring arrangement comprising a pair of flat split sealing rings for location in a piston ring groove of a piston so that said rings abut the upper and lower lands of said groove, a first axially-corrugated strip-form expander spring located between said sealing rings to apply said rings to said upper and lower lands respectively and a second axially-corrugated strip-form expander spring located within said sealing rings, said second expander spring having shaped ends for respectively contacting an abutment in a piston-ring groove to apply mutually opposite pressures to the two ends of said second expander spring to cause said second expander spring to apply radially outward pressure to said sealing rings without said second expander spring being supported by the base of said groove.

2. A composite piston ring arrangement comprising a pair of flat split sealing rings for location in a piston ring groove of a piston so that said rings abut the upper and lower lands of said groove, a first axially corrugated strip form expander spring located between said sealing rings to apply said rings to said upper and lower lands respectively, and a second axially corrugated strip form expander spring located within said sealing rings, said second expander spring having radially inwardly turned ends for engagement within an aperture in the base of a piston ring groove, to apply mutually opposite pressures to the two ends of said second expander spring to cause said second expander spring to apply pressure to said sealing rings without said second expander spring being supported by the base of said groove.

3. A composite piston ring arrangement comprising a pair of flat split sealing rings for location in a piston ring groove of a piston so that said rings abut the upper and lower lands of said groove, a first axially corrugated strip form expander spring located between said sealing rings to apply said rings to said upper and lower lands respectively, and a second axially corrugated strip form expander spring located within said sealing rings, said second expander spring having shaped ends for respectively contacting the opposite faces of a peg projecting radially outwardly from the base of a piston ring groove, to apply mutually opposite pressures to the two ends of said second expander spring to cause said second expander spring to apply pressure to said sealing rings without said second expander spring being supported by the base of said groove.

4. A piston and piston ring combination, said piston having a groove to receive said piston ring, wherein said piston ring comprises a pair of flat split sealing rings for location in said piston ring groove so that said rings abut the upper and lower lands of said groove, a first axially-corrugated strip-form expander spring located between said sealing rings to apply said rings to said upper and lower lands respectively, and a second axially-corrugated strip-form expander spring located within said sealing rings, said second expander spring having shaped ends and said piston ring groove being apertured to receive said shaped ends of said second expander spring, to apply mutually opposite pressures to the two ends of said second expander spring to cause said second expander spring to apply radial pressure to said sealing rings without said second expander spring being supported by the base of said groove.

5. A piston and piston ring combination, said piston having a groove to receive said piston ring, wherein said piston ring comprises a pair of flat split sealing rings for location in said piston ring grooves so that said rings abut the upper and lower lands of said groove, a first axially-corrugated strip-form expander spring located between said sealing rings to apply said rings to said upper and lower lands respectively, and a second axially-corrugated strip-form expander spring located within said sealing rings, said second expander spring having radially inwardly directed ends and the base of said piston ring groove being apertured to receive said ends of said second expander spring, to apply mutually opposite pressures to the two ends of said second expander spring to cause said second expander spring to apply radial pressure to said sealing rings without said second expander spring being supported by the base of said groove.

6. A piston and piston ring combination, said piston having a groove to receive said piston ring, wherein said piston ring comprises a pair of flat split sealing rings for location in said piston ring grooves so that said rings abut the upper and lower lands of said groove, a first axially corrugated strip form expander spring located between said sealing rings to apply said rings to said upper and lower lands respectively, and a second axially-corrugated strip-form expander spring having shaped ends and said piston ring groove being apertured in one of said upper and said lower lands, to receive said shaped ends of said second expander spring, to apply mutually opposite pressures to the two ends of said second expander spring to cause said second expander spring to apply radial pressure to said sealing rings without said second expander spring being supported by the base of said groove.

7. A piston and piston ring combination, said piston having a groove to receive said piston ring, wherein said piston ring comprises a pair of flat split sealing rings for location in said piston ring grooves so that said rings abut the upper and lower lands of said groove, a first axially-corrugated strip-form expander spring located between said sealing rings to apply said rings to said upper and lower lands respectively, and a second axially-corrugated strip-form expander spring located within said sealing rings, said second expander spring having shaped ends and said piston ring groove having a radially-outwardly directed peg against the opposite lateral faces of which said shaped ends of said second expander spring abut, to apply mutually opposite pressures to the two ends of said second expander spring to cause said second expander spring to apply radial pressure to said sealing rings without said second expander spring being supported by the base of said groove.

References Cited by the Examiner

UNITED STATES PATENTS

| 1,277,291 | 8/18 | Canfield | 277—136 |
| 1,847,731 | 3/32 | Solonberger | 277—136 |
| 1,910,917 | 3/33 | Harrington | 277—136 |
| 2,281,873 | 5/42 | Engelhardt | 309—44 |
| 2,676,076 | 4/54 | Hamm | 277—139 |
| 2,965,423 | 12/60 | Braendel | 309—45 |

FOREIGN PATENTS

| 292,389 | 6/28 | Great Britain. |
| 394,892 | 7/33 | Great Britain. |
| 216,769 | 3/39 | Switzerland. |

EDWARD V. BENHAM, *Primary Examiner.*
KARL J. ALBRECHT, *Examiner.*